(12) United States Patent
Cheng et al.

(10) Patent No.: US 11,508,243 B2
(45) Date of Patent: Nov. 22, 2022

(54) INTERSECTION TRAVEL COORDINATION VIA V2X COMMUNICATION

(71) Applicant: QUALCOMM Incorporated, San Diego, CA (US)

(72) Inventors: Hong Cheng, Bridgewater, NJ (US); Dan Vassilovski, Del Mar, CA (US); Zhibin Wu, Los Altos, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 15/929,588

(22) Filed: May 12, 2020

(65) Prior Publication Data

US 2020/0365033 A1 Nov. 19, 2020

Related U.S. Application Data

(60) Provisional application No. 62/848,516, filed on May 15, 2019.

(51) Int. Cl.
| | | |
|---|---|---|
| *G08G 1/00* | (2006.01) | |
| *H04W 4/40* | (2018.01) | |
| *G08G 1/0967* | (2006.01) | |
| *G08G 1/01* | (2006.01) | |
| *G08G 1/0968* | (2006.01) | |

(52) U.S. Cl.
CPC ............ *G08G 1/20* (2013.01); *G08G 1/0145* (2013.01); *G08G 1/096725* (2013.01); *G08G 1/096791* (2013.01); *G08G 1/096827* (2013.01); *H04W 4/40* (2018.02)

(58) Field of Classification Search
CPC .. G08G 1/20; G08G 1/0145; G08G 1/096725; G08G 1/096791; G08G 1/096827; H04W 4/40
See application file for complete search history.

(56) References Cited

U.S. PATENT DOCUMENTS

| | | | |
|---|---|---|---|
| 2013/0099911 A1 | 4/2013 | Mudalige et al. | |
| 2014/0278029 A1 | 9/2014 | Tonguz et al. | |
| 2019/0206254 A1* | 7/2019 | Tao | B60W 50/14 |
| 2020/0020234 A1* | 1/2020 | Cheng | G08G 1/0112 |

OTHER PUBLICATIONS

International Search Report and Written Opinion—PCT/US2020/032655—ISA/EPO—dated Jul. 20, 2020.

* cited by examiner

*Primary Examiner* — Hussein Elchanti
(74) *Attorney, Agent, or Firm* — Harrity & Harrity LLP/Qualcomm Incorporated

(57) ABSTRACT

Methods and apparatuses are provided for use in wireless communication devices to provide a capability for vehicles to actively perform traffic planning with regard to other vehicles, for example, within a region comprising an intersection and possibly wherein the intersection is not associated with a device or service for such or similar purposes. Such underlying techniques may reduce traffic congestion in certain instances by allowing two or more vehicles to negotiate or otherwise coordinate safe traversal within a region comprising an intersection. Moreover, the traffic planning techniques may be of use for a variety and/or mixture of different types of vehicles, paths, intersections, etc.

30 Claims, 8 Drawing Sheets

INTERSECTION TRAVEL COORDINATION VIA V2X COMMUNICATION

CLAIM OF PRIORITY UNDER 35 U.S.C. § 119

This application claims priority to and the benefit of Provisional Patent Application No. 62/848,516, filed in the United States Patent and Trademark Office on May 15, 2019, the entire content of which is incorporated herein by reference as if fully set forth below in its entirety and for all applicable purposes.

BACKGROUND

The following relates generally to wireless communications, and more specifically to transmission techniques that may be employed in wireless communication devices, and which in certain instances may promote opportunistic transmission capability in vehicle to everything (V2X) communication and/or the like.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may occur between vehicles and systems that use such communications. Accordingly, these systems may sometimes be referred to as vehicle-to-anything (V2X) communication systems. V2X communication links may convey important information to or from vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in messages so that other vehicles may receive such information. In certain implementations, a communication device, such as, a roadside unit (RSU) may be dedicated or otherwise (temporarily) provisioned to coordinate the movement (travel) of compatible UEs with regard to an intersection or some portion thereof. However, at times, an RSU or the like may be unavailable for a given region and/or intersection. Accordingly, techniques that provide for use in intersection travel coordination without an RSU or the like may be beneficial.

SUMMARY OF THE DESCRIPTION

In accordance with certain aspects, a method is provided for use at a first user equipment (UE) associated with a first vehicle. The example method includes, at the first UE: (a) receiving traffic information corresponding to at least one or more other vehicles; (b) determining, based at least in part on the traffic information, that a second vehicle of the one or more other vehicles is currently within or is expected to be within a proximate vicinity of the first vehicle, a region comprising an intersection, or both; (c) identifying, based at least in part on the traffic information associated with the second vehicle, a traffic plan for the first vehicle to traverse at least a portion of the region; (d) transmitting an intersection traversal request to a second UE associated with the second vehicle, the intersection traversal request being based, at least in part, on the traffic plan; (e) receiving an intersection traversal acknowledgement transmitted by the second UE; and (f) initiating traversal of the at least a portion of the region by the first vehicle with respect to at least the second vehicle in response to the intersection traversal acknowledgement.

In certain implementations of the above example method, the traffic information may comprise traffic information locally-obtained by the first UE, traffic information received from the second UE, traffic information received from the one or more other vehicles, or some combination thereof. In certain instances, the traffic information may correspond to least a third vehicle of the one or more vehicles, and wherein the first UE and the second UE each comprise a compatible wireless communication capability, and the third vehicle does not comprise the compatible wireless communication capability. In certain implementations, traffic information may be based, at least in part, on a sensor capability, a location capability, a routing capability, a vehicle characteristic, an environment characteristic, or some combination thereof, with regard to the first vehicle, the second vehicle, or at least one of the one or more other vehicles.

In certain implementations of the above example method the traffic information, the traffic plan, the intersection traversal request, and/or the intersection traversal acknowledgement may comprise information regarding: an open road space start location, an open road space stop location, an open road space distance measurement, a lane indication, an observation field of view or area, an unobserved area, a region identifier, an intersection identifier, a vehicle ingress point, a vehicle egress point, an estimated time of arrival (ETA), an estimated time to pass (ETP), a right-of-way (ROW) start time, a ROW end time, an intersection clearance indication, or some combination thereof corresponding, at least in part, to the region, the first vehicle, the second vehicle, at least one of the one or more vehicles, or some combination thereof. In certain instances, traffic information may correspond to one or more non-vehicle objects of traffic interest within the region.

In certain implementations of the above example method, the intersection traversal acknowledgement received at (e) may be indicative of the second UE accepting the intersection traversal request and wherein at (f) the traversal by the first vehicle may be based at least in part on the traffic plan as identified at (c).

In certain implementations of the above example method, the method may include a negotiating process between at least the first and second vehicles/UEs. For example, a negotiation may comprise repeating (a), (b), (c), (d), or some combination thereof prior to (e). In certain implementations, (a) may further comprise receiving additional traffic information from the second UE in response to at least the intersection traversal request transmitted at (d). In certain implementations, (c) may further comprise modifying at least a portion of the traffic plan for the first vehicle based, at least in part on the additional traffic information. In certain implementations, (d) may further comprise transmitting a second intersection traversal request to at least the second UE, the second intersection traversal request being based, at least in part, on the traffic plan as modified at (c). In certain implementations, at (e), the intersection traversal acknowledgement may be indicative of the second UE accepting the second intersection traversal request. In certain implementations, (f) may further comprise initiating the traversal by the first vehicle based at least in part on the traffic plan as modified at (c).

In certain implementations of the above example method, the intersection traversal request comprises a right-of-way (ROW) request. In certain implementations of the example method, at least the first UE and the second UE may comprise a vehicle-to-everything (V2X) capability, for example.

In accordance with certain other aspects, a method may be provided for use at a first user equipment (UE) associated with a first vehicle. The method may comprise, at the first UE: (a) receiving an intersection traversal request from a second UE associated with a second vehicle, the intersection traversal request being based, at least in part, on traffic information corresponding to at least the first vehicle, the second vehicle, at least one or more other vehicles, or some combination thereof; (b) determining whether the intersection traversal request is acceptable to the first vehicle based, at least in part, on a traffic plan for the first vehicle; and (c) transmitting an intersection traversal acknowledgement to at least the second UE, in response to a determination that the intersection traversal request is acceptable to the first vehicle.

In certain implementations of the second example method above, (b) may further comprise modifying the traffic plan based, at least in part, on the traffic information, the intersection traversal request, or both.

In certain implementations of the second example method above, the method may further comprise (d) initiating traversal of at least a portion of a region comprising an intersection by the first vehicle with regard to at least the second vehicle based at least in part on the intersection traversal request determined to be acceptable.

In certain implementations of the second example method above, at least a portion of the traffic information has been obtained by the second UE from the first UE. In certain instances, a portion of the traffic information obtained by the second UE from the first UE may comprise locally-generated traffic information corresponding to the first vehicle, the first UE, or both. In certain instances, the locally-generated traffic information may correspond to at least a third vehicle associated with a third UE. In certain implementations of the second example method above, the first UE and the second UE each comprise a compatible wireless communication capability, and the third UE does not comprise the compatible wireless communication capability.

In certain implementations of the second example method above, the intersection traversal request determined to be acceptable may comprise routing information for the second vehicle corresponding to at least a portion of a region comprising an intersection.

In certain implementations of the second example method above, the traffic information, the intersection traversal request, and/or the intersection traversal acknowledgement comprises information regarding: an open road space start location, an open road space stop location, an open road space distance measurement, a lane indication, an observation field of view or area, an unobserved area, a region identifier, an intersection identifier, a vehicle ingress point, a vehicle egress point, an estimated time of arrival (ETA), an estimated time to pass (ETP), a right-of-way (ROW) start time, a ROW end time, an intersection clearance indication, or some combination thereof corresponding, at least in part, to a region comprising an intersection, the first vehicle, the second vehicle, at least one of the one or more vehicles, or some combination thereof.

In certain implementations of the second example method above, (a), (b), or both, may occur a plurality of times before (c) occurs, for example, as part of a UE-based distributed negotiation process or the like. In certain instances, (a), (b), or both may include the use of a direct communication channel between the first UE and the second UE. In certain instances, an intersection traversal request may comprise a right-of-way (ROW) request or the like.

In accordance with still other aspects, a user equipment (UE) may be provided that may be associated with a vehicle in some manner. The example UE may comprise, at least a transceiver, memory, and a processing unit that is coupled to the transceiver and the memory. The processing unit may be configured to: (a) receive, via the transceiver, traffic information corresponding to at least one or more other vehicles, wherein at least a portion of the traffic information is received from a second UE associated with a second vehicle of the one or more other vehicles; (b) determine, based at least in part on the traffic information, that at least one of the one or more other vehicles is currently within a proximate vicinity of the vehicle, a region comprising an intersection, or both; (c) identify, based at least in part on the traffic information, a traffic plan for the vehicle to traverse at least a portion of the region, the intersection, or both; (d) initiate transmission of an intersection traversal request to at least the second UE via the transceiver, the intersection traversal request being based, at least in part, on the traffic plan; (e) receive, via the transceiver, an intersection traversal acknowledgement transmitted by at least the second UE in response to the intersection traversal request; and (f) initiate traversal of the at least a portion of the region, the intersection, or both by the vehicle based at least in part on the traffic plan and in response to the intersection traversal acknowledgement.

In accordance with yet other aspects, a UE may be provided that may be associated with a vehicle in some manner. Here, for example, a first user equipment (UE) associated with a first vehicle may comprise, at least, a transceiver, memory and a processing unit that is coupled to the transceiver and the memory and configured to: (a) receive an intersection traversal request from a second UE associated with a second vehicle, the intersection traversal request being based, at least in part, on traffic information corresponding to at least the first vehicle, the second vehicle, at least one or more other vehicles, or some combination thereof; (b) determine whether the intersection traversal request is acceptable to the first vehicle based, at least in part, on a traffic plan for the first vehicle; and (c) transmit an intersection traversal acknowledgement to at least the second UE, in response to a determination that the intersection traversal request is acceptable to the first vehicle.

DETAILED DESCRIPTION

Figure 1:
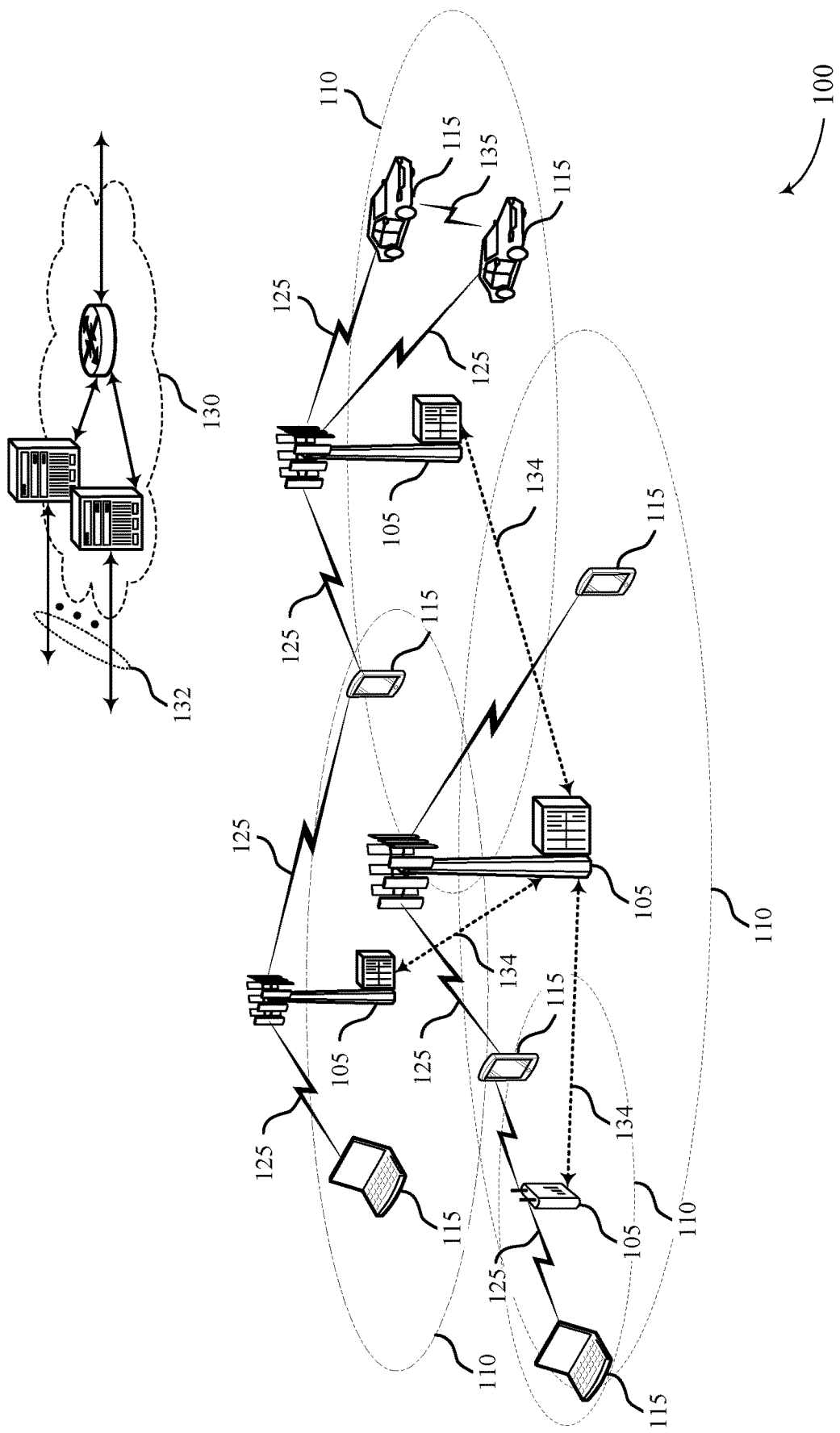
FIG. 1 illustrates an example of a system for wireless communications having various example wireless communication devices (e.g., a user equipment (UE)) that may benefit from all or part of the techniques presented herein, in accordance with certain aspects of the present disclosure.

Active traffic planning techniques are provided herein that may be implemented, at least in part, using one or more user equipments (UEs). All or some of the UEs involved in traffic planning may be associated with respective vehicles that may at times traverse all or part of a region having one or more paths applicable for a given type of vehicle. Within such a region, one or more paths may include an "intersection" of some type that causes path(s) to meet or otherwise change in some manner. Some example types of intersections include a shared intersection where two or more paths meet one another, a merge intersection where two or more paths merge to form a fewer number of paths, and a divide intersection where a path divides (splits) to form two or more paths. Active traffic planning may assist one or more of the vehicles with regard to such intersections which may bring vehicle(s) nearby other stationary or moving vehicles, obstacles, pedestrians, or other characteristics regarding an intersection that may be considered in planning safe traversal (e.g., navigation) within the region.

In certain instances, a UE may be a part of a vehicle having been included in the vehicle's manufacture, or perhaps subsequently added (affixed) to the vehicle in a similar manner so that it becomes part of the vehicle. Thus, for example, a UE may be provisioned in a truck or automobile, possibly as part of a navigation system, an entertainment system, an autonomous driving system, an onboard computing system, etc. In other instances, a UE may be associated with a vehicle despite not being part of the vehicle. For example, a UE may take the form of a portable wireless communication device that may be carried by a vehicle (at times) and when carried by a vehicle may or may not be configured to operate with other devices or like capabilities of the vehicle. Such a portable wireless communication device may take the form of a smart phone, a satellite-based navigation unit or the like, that may operate as a standalone device providing turn-by-turn navigation assistance or other useful information to a person driving a vehicle. Such portable wireless devices may, for example, be (removably) connected to a vehicle possibly by a mechanical support, an electrical power connection, a wired or wireless data connection, etc. Accordingly, in certain instances, a vehicle may be UE-enabled by way of either an affixed UE, a removably connected UE, or some combination thereof.

In certain implementations, the techniques provided herein may allow two or more vehicles that are UE-enabled to exchange traffic information regarding at least a portion of the region and at least portion of an intersection therein. The exchanged information may be useful for traffic planning by one or more of the vehicles. Such techniques may, for example, help to reduce traffic congestion, increase safety, improve driver/passenger awareness or experience, etc.

In certain instances, the active traffic planning techniques presented herein may allow two or more UEs to negotiate or otherwise coordinate their respective travel within at least a portion of a region that includes one or more intersections. In certain instances, some intersections may be associated with a roadside unit (RSU) or other like network device/service that may be configured to manage or otherwise assist in traffic planning with regard to the intersection. In certain instances, such capabilities may be part of the active traffic planning techniques provided herein. For example, in certain implementations an RSU or other like (perhaps stationary) wireless communication device/service associated with an intersection may be configured to directly or indirectly share (exchange) traffic information with one or more vehicles that are UE-enabled. Indeed, such intersection associated devices may be considered as comprising UEs in accordance with certain aspects. Thus, some UEs may be associated with an intersection or nearby part of a region and may generate, gather, store, share, combine, various types of traffic information, some of which may be considered in the traffic planning techniques herein. So, as described in greater detail herein, various types vehicles/UEs may be configured to support traffic planning for at least one participating vehicle that is expected to traverse or may currently be traversing the intersection in some manner.

The terms "vehicle" and "UE" may be used interchangeably in certain sections herein to represent vehicles that are UE-enabled and configured to provide or otherwise support the active traffic planning technique being described. Wherein a vehicle or UE may be intended to represent a differently operating, provisioned or configured vehicle or device, an appropriate description is provided. For example, in certain aspects an active traffic planning technique may consider traffic information indicating at least an expected/current presence with regard to an intersection, of a "detected" vehicle, or a "known" vehicle (or likewise, a detected or known UE).

While many of the examples described herein include traditional vehicles such as, for example, automobiles, trucks, busses, motorcycles, and the like, it should be understood that the techniques presented herein may apply to a variety of less traditional vehicles such as, for example, bicyclists, pedestrians, equestrians, trains, robotic machines, scooters, etc., which may comprise or otherwise be provisioned with a UE, and/or may become known or detected by one or more of the UEs that may be more directly involved in an active traffic planning process as presented herein.

By way of an example, an active traffic planning process may be performed by an automobile and a commuter bus, each comprising compatible UEs. In addition to considering traffic information associated with their own intended/desired movements through the region and/or intersection, one or both of these vehicles, e.g., the automobile and bus, may also consider traffic information regarding a detected vehicle (e.g., a truck) sans a compatible UE. In certain instances, for example, at least a portion of the traffic information relating to the truck may be based, at least in part, on corresponding data gathered using one or more sensor(s) of the automobile, the bus, another UE (e.g., an RSU), etc., and/or from traffic information obtained for a network resource.

In certain aspects, active traffic planning may consider traffic information regarding various types of paths within the region or the intersection. By way of some examples, a route for a vehicle through an intersection may be determined, at least in part, using traffic planning techniques as presented herein. Such a route may, for example, indicate one or more paths applicable to the traffic. In certain instances, a path may correspond to a particular lane or other like portion of a roadway, a bridge, an intersection, a bike path, etc. Thus, a multiple lane highway may comprise a plurality of paths, as might an intersection with multiple lane roadways, turn lanes, etc. The traffic intended for a given path may be limited by design to a particular form of traffic in certain instances. In certain instances, an intended traffic use of a lane may vary dynamically in some manner. For example, the direction of travel for certain lanes (paths) of an expressway or tollway may change at times to accommodate rush hour traffic. In another example, an entire roadway having multiple lanes (paths) may be closed to vehicular traffic at times to accommodate pedestrian traffic. In certain instances, traffic information may include map information or the like regarding a region and an intersection, and which may also indicate the presence of other types of paths, possibly for other types of traffic within or nearby the intersection. Thus, in certain aspects active traffic planning may consider other types of traffic and paths based, at least in part, on the traffic information. For example, in some example implementations, one or more paths and applicable types of traffic that may be considered for traffic planning may correspond to one or more pedestrian walkways/crosswalks, bike lanes, bus lanes, trolley lanes, HOV lanes, toll lanes, roadside parking sections, parking structure entrances/exits, passenger pick-up/drop-off sections, just to name a few examples.

In certain instances, active traffic planning techniques may also consider traffic information that may indicate in some manner that one or more paths may or may not affected by traffic conditions, accidents, construction, environmental conditions, regulations, etc. For example, a network server may provide such information to a UE by a base station or other like device.

Given the above basic examples, it should be understood that the traffic planning techniques provided herein may be used for a variety of differently designed traffic regions and intersections and that claimed subject matter in not necessarily limited by the examples provided herein.

As used herein, the term "intersection" is intended to represent various types of junctions or the like wherein two or more paths cross, merge/combine, split/divide, etc. Thus, in certain instances, an intersection may comprise a two-way junction, a three-way junction, . . . , or other multiple way junction, as are well known, a lane merge, a multiple-lane merge, a lane split, a multiple lane split, a roundabout, a multiple lane round about, or other junction layout/design. Unless otherwise specified, claimed subject matter in not necessarily intended to be limited to such examples.

Some wireless communications systems may be used to facilitate communications with and/or between various devices, which may include UEs that may be provisioned in vehicles and these systems may support vehicle-to-everything (V2X) communications. As an example, UEs may employ V2X communication to convey information (data) between vehicles, etc. Some V2X communications may be unicast (e.g., between two UEs) or possible groupcast (e.g., between various UEs within a group, such as, a platoon, etc.). In still other instances, some V2X communications may be broadcast (e.g., one UE to many other devices).

It should be understood, that the term V2X communication as used herein is not intended to necessarily limit the techniques presented herein. Instead, the term V2X is used simply just to represent various forms of UEs communicating with one or more other devices, whether provisioned as part of the vehicle or other machine, carried by a person or animal, moving or stationary, etc. In certain instances, a V2X communication may referred to as a sidelink communication, with these terms being interchangeable. Further, the term V2X is intended to represent various technologies that may support V2X communication. By way of some non-limiting examples, a V2X communication may comprise a cellular-V2X (C-V2X) communication, a device-to-device (D2D) communication, and/or the like or some combination thereof.

In accordance with certain aspects, a V2X communication may be conducted, at least in part, using one or more communication resource allocation grants. In certain instances, a communication resource allocation may be requested by a "scheduled" device (e.g., via one or more communication resource allocation requests) and granted by a "scheduling" device (e.g., via one or more communication resource allocation grants). In certain instances, a UE may comprise either a scheduled device or a scheduling device. Thus, as a scheduled device, a UE may receive communication resource allocation grants from another device, e.g., another UE, a base station, etc. Conversely, as a scheduling device, a UE may grant a communication resource allocation to another device, e.g., another UE, a base station, etc.

Attention is now drawn to FIG. 1, which illustrates an example of a wireless communications system 100 that may support V2X communication and traffic planning in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, ProSe direct communications). Sidelink communication may be used for D2D media-sharing, vehicle-to-vehicle (V2V) communication, V2X communication, enhanced V2X (eV2X) communication, etc.), emergency rescue applications, etc. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a first UE 115 of a sidelink connection) and a receiving device (e.g., a second UE 115 of a sidelink connection), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation). Both digital and analog beaming techniques are well known.

In one example, a base station 105 or UE 115 may use multiple antennas or antenna arrays to conduct beamforming operations for directional communications with a UE 115 recipient. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105, a first UE 115, or a receiving device, such as a second UE 115) a beam direction for subsequent transmission and/or reception by the base station 105.

Some signals, such as data signals associated with a particular receiving device, may be transmitted by a base station 105 or a first UE 115 in a single beam direction (e.g., a direction associated with the receiving device, such as a second UE 115). In some examples, the beam direction associated with transmissions along a single beam direction may be determined based at least in in part on a signal that was transmitted in different beam directions. For example, a receiving UE 115 may receive one or more of the signals transmitted by a base station 105 or a transmitting UE 115 in different directions, and the receiving UE 115 may report to the base station 105 or the transmitting UE 115 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. In cases where D2D or V2X communications are used, a V2X layer may provide related protocols, and in some cases may use ProSe direct communications protocols (e.g., PC5 signaling). A RLC layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, data transmissions (e.g., target traffic) may be periodically broadcasted from a UE 115 or base station 105. For example, in V2X communications, a vehicle (e.g., or a UE 115) may broadcast safety messages at times, possibly periodically, to enable nearby vehicles, sensors, or additional UEs 115 to receive traffic or other like information about the transmitting vehicle, etc.

Wireless communications system 100 may support efficient techniques for establishing a unicast link (e.g., connection) between two wireless devices (e.g., UEs 115, vehicles, sensors, etc.). For example, a connection-oriented link may be established by a V2X layer of a protocol stack between the two wireless devices that supports an optimized AS layer configuration (e.g., over-the-air) for higher throughput (e.g., 64 quadrature amplitude modulation (QAM), CA, etc.), supports enhanced security protection, and allows more efficient resource usage (e.g., power control, beam management, etc.). In some cases, the unicast connection may be established over a sidelink 135 between the two wireless devices, for example, without going through a base station. To establish the unicast connection over the sidelink 135, a first UE 115 may transmit a request message to a second UE 115, and the second UE 115 may transmit a response message accepting the request to the first UE 115.

Additionally, the first UE 115 may transmit a connection complete message to the second UE 115 and establish a security context with the second UE 115 as part of establishing a connection over the sidelink 135. In some cases, the request message, the response message, and the connection complete message may be transmitted via RRC signaling (e.g., over PC5 to have unified PC5 and Uu management). Additionally, a connection may be established based on parameters (e.g., capabilities, connection parameters, etc.) for the first UE 115 and/or the second UE 115 that are transmitted in the respective request message and/or response message. For example, the parameters may include PDCP parameters, RLC parameter, MAC parameters, PHY layer parameters, capabilities of either UE 115, or a combination thereof. Such communications may be performed as part of a link management process.

Figure 2:
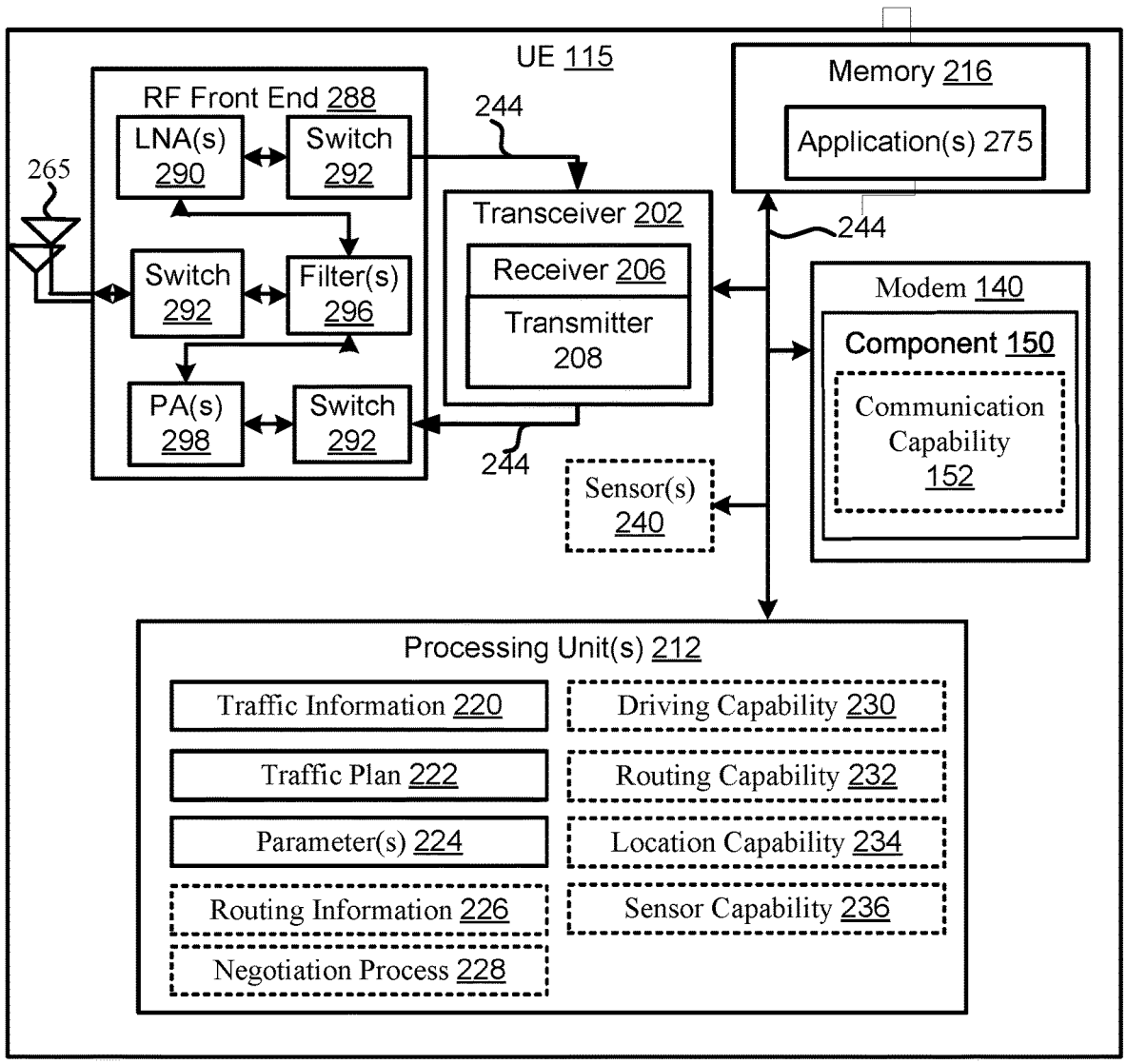
FIG. 2 is a block diagram illustrating some features of an example apparatus for use in a UE configured for V2X communications or the like, in accordance with certain aspects of the present disclosure.

Attention is drawn next to FIG. 2, which is a block diagram illustrating some features of an example apparatus for use as or use in a UE 115 configured for V2X communications or the like and traffic planning, in accordance with certain aspects of the present disclosure.

Referring to FIG. 2, one example of an implementation of the UE 115 may include a variety of components including components such as one or more processing units 212 and memory 216 and transceiver 202 in communication via one or more buses 244, which may operate in conjunction with the modem 140 and the communication component 150 to enable one or more of the functions described herein related to V2X and related communications supportive of traffic planning. Further, the one or more processing unit(s) 212, modem 140, memory 216, transceiver 202, RF front end 288 and one or more antennas 265, may be configured to support voice and/or data calls (simultaneously or non-simultaneously) in one or more radio access technologies.

In an aspect, the one or more processing unit(s) 212 may include modem 140 that uses one or more modem processors. The various functions related to a communication component 150 may be included or otherwise implemented, at least in part, in modem 140 and/or processing unit(s) 212 and, in an aspect, may be executed by a single processor, while in other aspects, different ones of the functions may be executed by a combination of two or more different processors. For example, in an aspect, the one or more processing unit(s) 212 may include any one or any combination of a modem processor, or a baseband processor, or a digital signal processor, or a transmit processor, or a receiver processor, or a transceiver processor associated with transceiver 202. In other aspects, some of the features of the one or more processing unit(s) 212 and/or the modem 140 associated with the communication component 150 may be performed by transceiver 202.

Also, memory 216 may be configured to store data used herein and/or local versions of applications 275 for the communication component 150 and/or one or more subcomponents of the communication component 150 being executed by at least one processing unit(s) 212. Memory 216 can include any type of computer-readable medium usable by a computer or at least one processing unit(s) 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining all or part of communication component 150 and/or one or more of its subcomponents, and/or data associated therewith, when UE 115 is operating at least one processing unit(s) 212 to execute the communication component 150 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 115 may include RF front end 288, which may operate in communication with one or more antennas 265 and transceiver 202 for receiving and transmitting radio transmissions, for example, wireless communications transmitted by at least one base station 105 or wireless transmissions transmitted by UE 115. RF front end 288 may be coupled with one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be coupled with a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processing unit(s) 212.

As such, transceiver 202 may be configured to transmit and receive wireless signals through one or more antennas 265 via RF front end 288. In an aspect, transceiver may be tuned to operate at specified frequencies such that UE 115 can communicate with, for example, one or more base stations 105 or one or more cells associated with one or more base stations 105. In an aspect, for example, the modem 140 can configure transceiver 202 to operate at a specified frequency and power level based on the UE configuration of the UE 115 and the communication protocol used by the modem 140. All or part of either or both, transceiver 202 and RF front end 288 may be configured, at least in part, as representing an NR RAT, and possibly also as representing an LTE RAT, and/or the like.

In an aspect, the modem 140 can be a multiband-multimode modem, which can process digital data and communicate with transceiver 202 such that the digital data is sent and received using transceiver 202. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 115 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 115 as provided by the network during cell selection and/or cell reselection.

As illustrated in FIG. 2, an example communication component 150 may be configured, at least in part, based on all or part of one or more layers of a communication protocol stack represented herein by communication capability 152, some of which may support V2X communication supportive of traffic planning techniques presented herein. In certain instances, two or more UEs having applicable communication capabilities may be involved in traffic planning, e.g., through sharing traffic information and/or various parameters, negotiating traffic plan(s) via request and acknowledgement messaging, etc.

Accordingly, as illustrated in FIG. 2, processing unit(s) 212 may comprise or otherwise process traffic information 220, some of which may be locally generated or obtained by the UE 115 and some of which may be received from one or more other UEs supporting traffic planning. The traffic information 220 from another UE may, for example, comprise information that is locally generated or obtained by that UE. Traffic information, regardless as to its source, may correspond to one or more vehicles that may be of interest in traffic planning for a region and/or intersection therein. Various examples of possible traffic information are described herein.

One or more processing unit(s) 212 may comprise or otherwise process a traffic plan 222. Here, for example, a traffic plan 222 may comprise one or more parameters 224 that may be used by applicable UEs to coordinate traffic within a region and/or intersection as part of a traffic planning technique provided herein. In certain implementations a traffic plan may be used as part of a negotiation process 228 to negotiate intersection traversal via request and acknowledgement messaging between applicable UEs. Various routing information 226 corresponding to various routes within a region and/or intersection that may, for example, be used for traffic plan 222 and/or parameter(s) 224. By way of an example, a map or other like resource may define certain pathways through the region or intersection. Some non-limiting examples of various types of useful information and parameters are described in greater detail herein.

Additionally, as illustrated by dashed-line boxes indicating optional aspects in certain implementations, one or more processing unit(s) 212 may comprise or otherwise process a driving capability 230, a routing capability 232, a location capability 234, a sensor capability 236, or the like or some combination thereof. By way of an example, a driving capability 230 may provide an ability to assist human driving of a vehicle, or possibly to provide a form of semi-autonomous or even fully-autonomous driving in certain instances. Thus, (optional) driving capability 230 may act in some manner to control some aspect of the movement of an applicable vehicle comprising UE 115. In using an example routing capability 232, UE 115 may be able to provide routing information to a user (e.g., driver) and/or a driving capability 230, wherein the routing information may correspond to all or part of the region and/or intersection, the traffic plan, a map resource, etc. Similarly useful, a location capability 234 may provide location information relating to the position and/or movement of the vehicle associated with UE 115. For example, a location capability may use satellite positioning system (SPS), terrestrial positioning, and/or the like or some combination thereof to determine an estimated location and/or movement of the UE with regard to one or more coordinates, etc. Such location techniques are well-known and include GNSS, cellular and/or other wireless signal location determination, e.g., via multi-lateration measurements, etc. Sensor capability 236 is representative of one or more capabilities that may generate and/or otherwise process traffic information that may be of use for traffic planning. In certain implementations, one or more sensors 240 may be provided within UE 115 and/or within a vehicle (not shown) associated with UE 115. The sensor(s) 240 and/or sensor capability 236 may, for example, be configured to support object detection, recognition, classification, etc., for use in traffic planning. By way of some non-limiting examples, a sensor capability 236 may comprise or otherwise correspond capabilities associated with one or more sensors, such as, a radar, a LIDAR, a sonar, a camera, a microphone, and/or the like or some combination thereof, which may be used, at least in part, to generate or affect traffic information 220, traffic plan 222, one or more parameters 224, or the like or some combination thereof. In certain instances, sensor capability 236 may, for example, generate or otherwise process one or more of the various example types of information illustrated in FIG. 3 as traffic information 220 and/or in accordance with the other example blocks in the distributed negotiation process 300.

In certain implementations, one or more of traffic information 220, traffic plan 222, an intersection traversal request, an intersection traversal acknowledgement, or the like may comprises one or more parameters 224 indicative of or otherwise associated with an open road space start location, an open road space stop location, an open road space distance measurement, a path or road indication, a lane indication, an observation field of view or area (e.g., of object sensing, detection), an unobserved area (e.g., lacking object sensing, detection, etc.), a region identifier, an intersection identifier, a vehicle ingress point, a vehicle egress point, an estimated time of arrival (ETA), an estimated time to pass (ETP), a right-of-way (ROW) start time, a ROW end time, an intersection clearance indication (e.g., relating to one, two, or possibly three dimensions) , or some combination thereof corresponding, at least in part, to the region or the intersection, the vehicle, at least one of the one or more vehicles, or some combination thereof.

It should be noted that, features in dashed lined boxes may be optional in certain implementations. Of course, features in solid lined boxes may also be optional in certain other implementations. Claimed subject matter is not intended to be as limited as the various examples presented herein.

Figure 3:
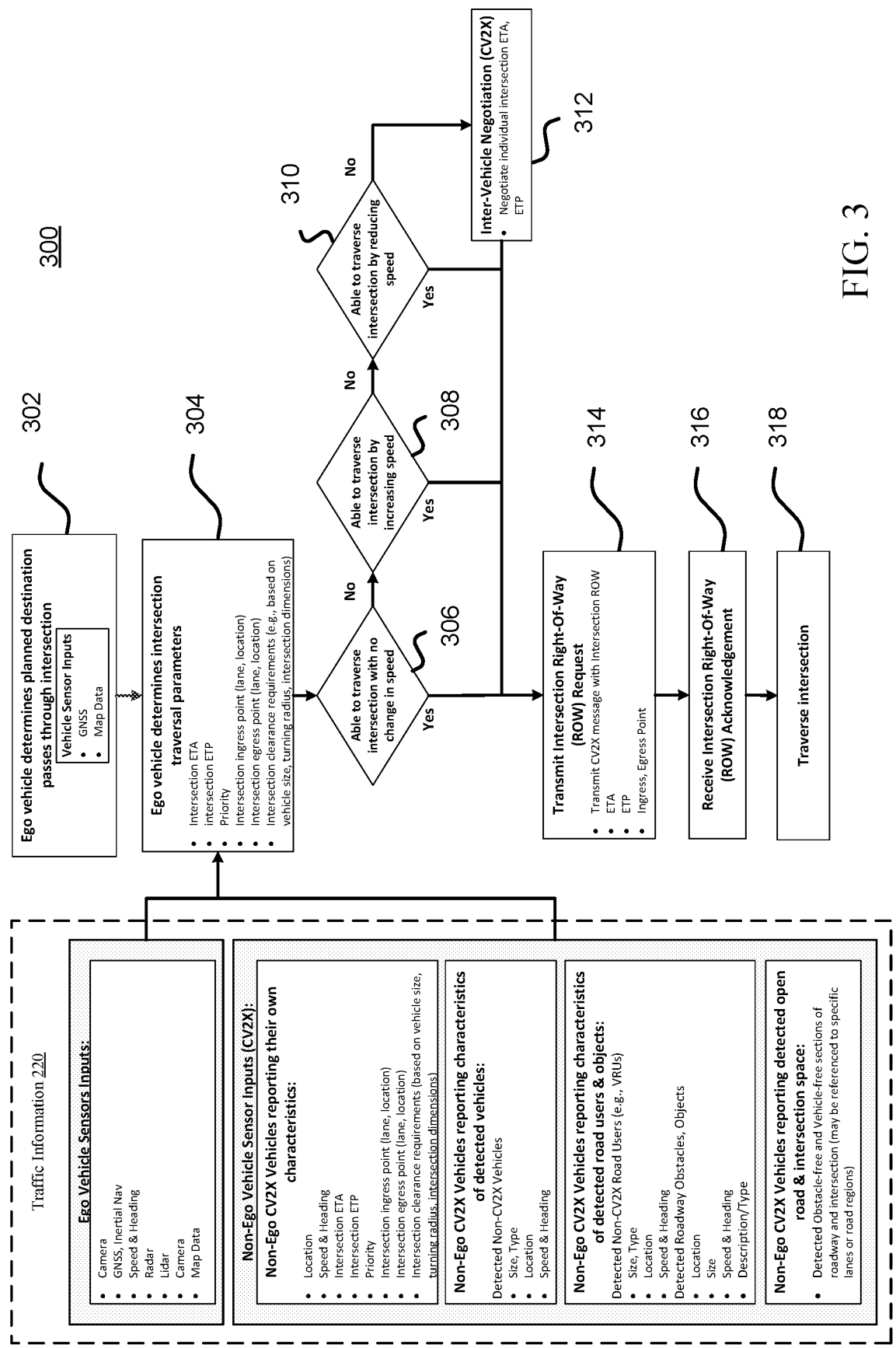
FIG. 3 is a flow-diagram illustrating an example UE-based distributed negotiation process method for use in intersection travel coordination between two or more UEs, in accordance with certain aspects of the present disclosure.

Attention is drawn next to FIG. 3, which is a flow-diagram illustrating some aspects that may be useful to a UE-based, distributed negotiation process 300 (e.g., a traffic planning method) for use in intersection travel coordination between two or more UEs, in accordance with certain aspects of the present disclosure. All or part of process 300 may be supported, at least in part, by example UE 115 of FIG. 2.

At block 302, the UE which is associated with the Ego vehicle may determine (e.g., from routing information 222, routing capability 232, etc.) that a route planned for a particular destination or course includes a region comprising an intersection. As shown, vehicle sensor inputs, such as GNSS information, map data, and/or the like or some combination thereof may be considered, at least in part, in making the determination at block 302.

At block 304, the UE may determine one or more intersection traversal parameters (e.g., one or more of which may be provided in traffic plan 222, parameter(s) 224, etc.) based, at least in part, on traffic information 220. As shown in this example, traffic information 220 may comprise a variety of useful information, some of which may be locally-generated or otherwise obtained by the (Ego, CV2X) UE, some of which may be received from one or more other (non-Ego, CV2X) UEs (associated with other vehicles) and which may correspond to the transmitting (non-Ego, CV2X) UE and its associated vehicle or to one or more other (non-Ego, non-CV2X) vehicles that may be known or otherwise detected by the transmitting UE, or some combination of such. Thus, for example, as shown, traffic information 220 may comprise Ego vehicle sensor input(s) or the like, non-Ego vehicle sensor input(s) or the like for a UE having an applicable communication capability (e.g., CV2X), reported characteristics of detected (non-Ego, non-CV2X) vehicles, reported characteristics of (non-Ego, non-CV2X) detected "vehicles" comprising road users and/or objects, reported detected open road and/or intersection space or other like measurements, etc., that may be provided by a non-Ego, CV2X UE to the Ego UE.

At block 306 a determination may be made as to whether the Ego UE (vehicle) may or may not be able to (safely) traverse the intersection with no change in speed based, at least in part on the parameters determined at block 304. If block 306 results in a YES decision, then process 300 may continue at block 314. In response to a NO decision at block 306, process 300 may continue at block 308 in which a determination is made as to whether the Ego UE (vehicle) may be able to (safely) traverse the intersection with an increase in speed based, at least in part on the parameters determined at block 304. If block 308 results in a YES decision, then process 300 may continue at block 314. In response to a NO decision at block 308, process 300 may continue at block 310 in which a determination is made as to whether the Ego UE (vehicle) may be able to (safely) traverse the intersection by reducing speed based, at least in part on the parameters determined at block 304. If block 310 results in a YES decision, then process 300 may continue at block 314. In response to a NO decision at block 310, process 300 may continue at block 312 in which applicable changes may be made to the intersection traversal parameters that may permit a YES decision at one of blocks 306, 308, and 310.

Once example process has reached block 314, the Ego UE (vehicle) may transmit an intersection traversal request (herein shown as a ROW request). In other words, at example block 314, the Ego UE (vehicle) has determined a safe way for it to proceed to traverse the intersection safely based on the traffic information 220, and has requested a ROW based on the resulting traffic plan. At example block 316, a non-Ego CV2X UE, in response to the requested ROW may transmit back an intersection traversal acknowledgment, which may serve as an indication of acceptance of the Ego UE (vehicle) traffic plan. Thus, at block 318, the Ego UE (vehicle) may initiate its traffic plan and traverse the intersection accordingly. Conversely, if no acknowledgement timely received, or a non-acknowledgment is timely received, then rather than continuing at block 316, the process 300 may end without successfully negotiating a traffic plan. Alternatively, process 300 may be repeated in some manner if time permits, e.g., from blocks 302 or 304, so as to possibly negotiate a modified traffic plan and/or parameter(s) that may lead to the non-Ego UE acknowledging (accepting) such as block 316. Hence, in certain instances, negotiations between applicable UEs may be based on repeated attempts to complete process 300.

By way of some none-limiting examples, traffic information 220 in FIG. 3 includes some potential Ego vehicle sensor input examples associated with a camera, a GNSS, an inertial navigation unit, a speed, a heading, a radar, a LIDAR, and map data. Of course, it should be recognized that other types of information associated with and/or produced by the Ego vehicle (UE) may be provided in traffic information 220.

Traffic information 220 in FIG. 3 includes some potential non-Ego CV2X vehicle sensor input examples associated with characteristics (local) of the non-Ego CV2X vehicle itself, characteristics of (other) detected vehicles (e.g., possibly non-CV2X compliant vehicles), characteristics of detected road users and/or objects/environment, information regarding open road space, intersection space and/or distance measurements, and/or or the like or some combination thereof. Of course, it should be recognized that other types of information associated with and/or produced by the Ego vehicle (UE) may be provided in traffic information 220.

By way of some none-limiting examples, potential non-Ego CV2X vehicle sensor input examples associated with characteristics (local) of the non-Ego CV2X vehicle itself may correspond to location, speed, heading, an intersection ETA, an intersection ETP, a priority (e.g., relating to one or more other vehicles), an intersection ingress point (e.g., road, lane, location), an intersection egress point (e.g., road, lane, location), and intersection clearance aspects/requirements/limitations (e.g., relating to an intersection or vehicle size/dimension aspect, turn or merge aspect, weight aspect, etc.).

By way of some none-limiting examples, potential non-Ego CV2X vehicle sensor input examples associated with characteristics of (other) detected vehicles (e.g., possibly non-CV2X compliant vehicles) may correspond to size, type, location, speed, heading, and/or the like or some combination thereof.

By way of some none-limiting examples, potential non-Ego CV2X vehicle sensor input examples associated with characteristics of detected road users and/or objects/environment may correspond to size, type, location, speed, heading, etc., of detected non-CV2X road users, or other objects that may be of interest in traffic planning.

By way of some none-limiting examples, potential non-Ego CV2X vehicle sensor input examples associated with information regarding open road space, intersection space and/or distance measurements, and/or or the like may correspond to detected certain roads, lanes, intersection, or other like regions or areas that may be of interest in traffic planning.

As may be appreciated, in certain instances, it may be useful for process 300 and/or the other example techniques provided herein to identify traffic planning that safely permits the various "vehicles" within a region or intersection to safely traverse such in an efficient manner (e.g., time efficient, energy efficient, etc.).

Figure 4:
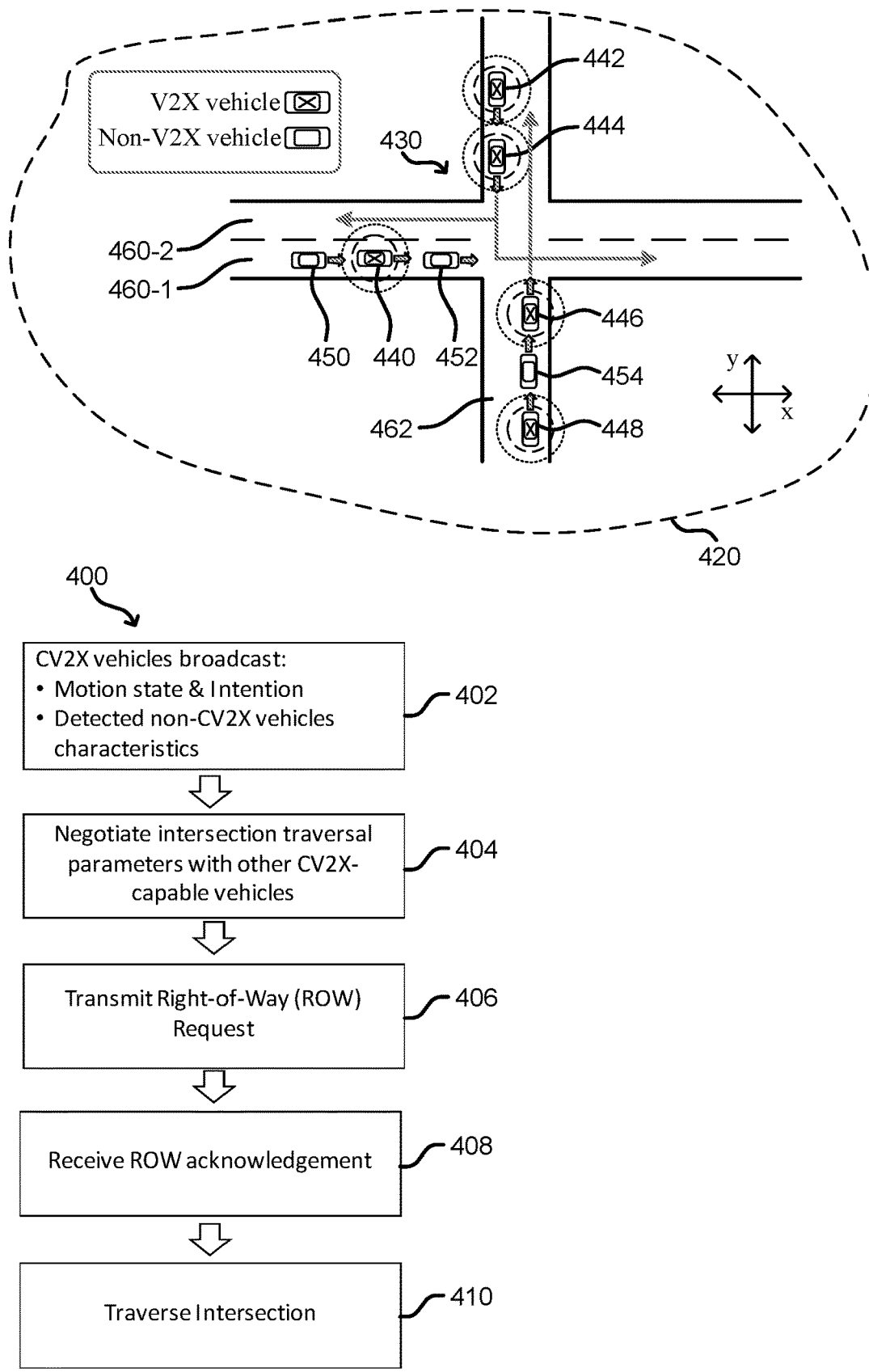
FIG. 4 is a diagram illustrating some features of an example region comprising an intersection and a plurality of UEs (represented by vehicles) and a flow-diagram illustrating an example negotiation process method for use in intersection travel coordination between at least two of the illustrated UEs, in accordance with certain aspects of the present disclosure.

Attention is drawn next to FIG. 4, which is a diagram illustrating some features of an example region 420 comprising an intersection 430 and a plurality of UEs (represented by vehicles) and a flow-diagram illustrating an example negotiation process 400 for use in intersection travel coordination between at least two of the illustrated UEs, in accordance with certain aspects of the present disclosure.

In this example, intersection 430 comprises a four-way intersection formed by a roadway shown as having a dashed-line dividing a traffic lane 460-1 (for traffic in a positive x-direction) and a traffic lane 460-2 (for traffic in a negative x-direction), and another roadway 462 also supporting bidirectional travel extending along a y-axis perpendicular to an x-axis. Shown as approaching the intersection on lane 460-1 are vehicles 450, 440, and 452 (in order, with 452 closest to the intersection), and of which only vehicle 440 is illustrated as being a CV2X vehicle (UE). On roadway 462, heading towards the intersection in a negative y-direction are vehicles 442 and 444 (in order with 444 closest to the intersection), both of which are illustrated as being CV2X vehicles (UEs). Also on roadway 462, but heading towards the intersection in a positive y-direction are vehicles 448, 454 and 446 (in order with 446 closest to the intersection), of which only vehicles 448 and 446 are illustrated as being CV2X vehicles (UEs). Thus, as illustrated some of the vehicles within region 420 approaching intersection 430 are CV2X vehicles (UEs) and some are not. Accordingly, the CV2X vehicles (UEs) will need to take into consideration the non-CV2X vehicles in their traffic planning. In this example, it may be assumed that vehicle 440 may have detected or otherwise been made aware of non-CV2X vehicle 450 travel behind it and non-CV2X vehicle 452 traveling in front of it. Similarly, in this example, it may be assumed that non-CV2X vehicle 454 may have been detected or otherwise been made aware of by one or both of CV2X vehicles (UEs) 448 and 446.

With this example intersection and vehicle arrangement in mind, example process 400 may be considered to show how an example traffic planning technique may be performed by two or more of the CV2X vehicles (UEs). At block 402, the CV2X vehicles in region 420 may broadcast traffic information 220. At block 404, two or more of the CV2X vehicles may determine/suggest/approve or otherwise negotiate acceptable parameters for safe intersection traversal of all or some of the various vehicles shown. For example, CV2X vehicle 444 and 446 which are approaching the intersection may need to consider reported/detected non-CV2X vehicles 452 and 454 for traffic planning because non-CV2X vehicle 452 is close to entering the intersection on lane 460-1, and one CV2X vehicle 446 has traversed the intersection safely, non-CV2X vehicle 454 may be about to enter the intersection. In other words, the CV2X vehicles (UEs) that are able to support traffic planning will need to consider the seemingly unaware non-CV2X vehicles in the traffic planning. Thus, in this example, CV2X vehicles 446 and 444 may need plan for non-CV2X vehicle 452 to traverse the intersection before either enter the intersection. However, once the intersection is safe, CV2X vehicles 444 and 446 may be able to plan their respective traversal routes in a safe manner, e.g., depending on their routes. This may occur, for example at blocks 402, 404, 406, and 408, possibly with some repetition and refinement as part of a negotiation. Also, in this example, CV2X vehicle 440 may become involved in some manner to possibly wait for vehicles 542, 446, 454, and 444 to clear the intersection so that non-CV2X vehicle 450 is not permitted to enter the intersection until after CV2X vehicle 440 has traversed the intersection. Hence, in this example, where possible the CV2X-vehicles that are ahead of non-CV2X vehicles may be used to control to some extent the time at which the non-CV2X vehicle may enter the intersection. At block 410 a CV2X vehicle may traverse the intersection accordingly, e.g., per the accepted traffic plan. As two or more CV2X vehicles become the next vehicles to possibly traverse the intersection, they may use process 400 or the like to plan their traversals in some safe manner, and with non-CV2X vehicles that may be nearby considered accordingly.

In certain aspects a CV2X vehicle may use the information received in 402 along with information from its own sensors to determine what its trajectory (speed, heading and so on) will allow it to safely traverse the intersection. Once it has determined such, a "Right-Of-Way" (ROW) message or the like may act as a claim to or a lock down regarding the vehicles ability/intention to traverse the intersection accordingly. It's certainly the case that other vehicles/UEs may not acknowledge or may decline such a request, but such a decline would likely be rare, and possibly result from some previously unforeseen event or change having occurred. Thus, in certain instances, a claim or assertion of right-of-way based on the initial sensor sharing and negotiation, e.g., for example as shown in FIG. 3, may provide traffic planning that is predisposed or otherwise likely to be agreed to by one or more other involved vehicles.

Figure 5A:
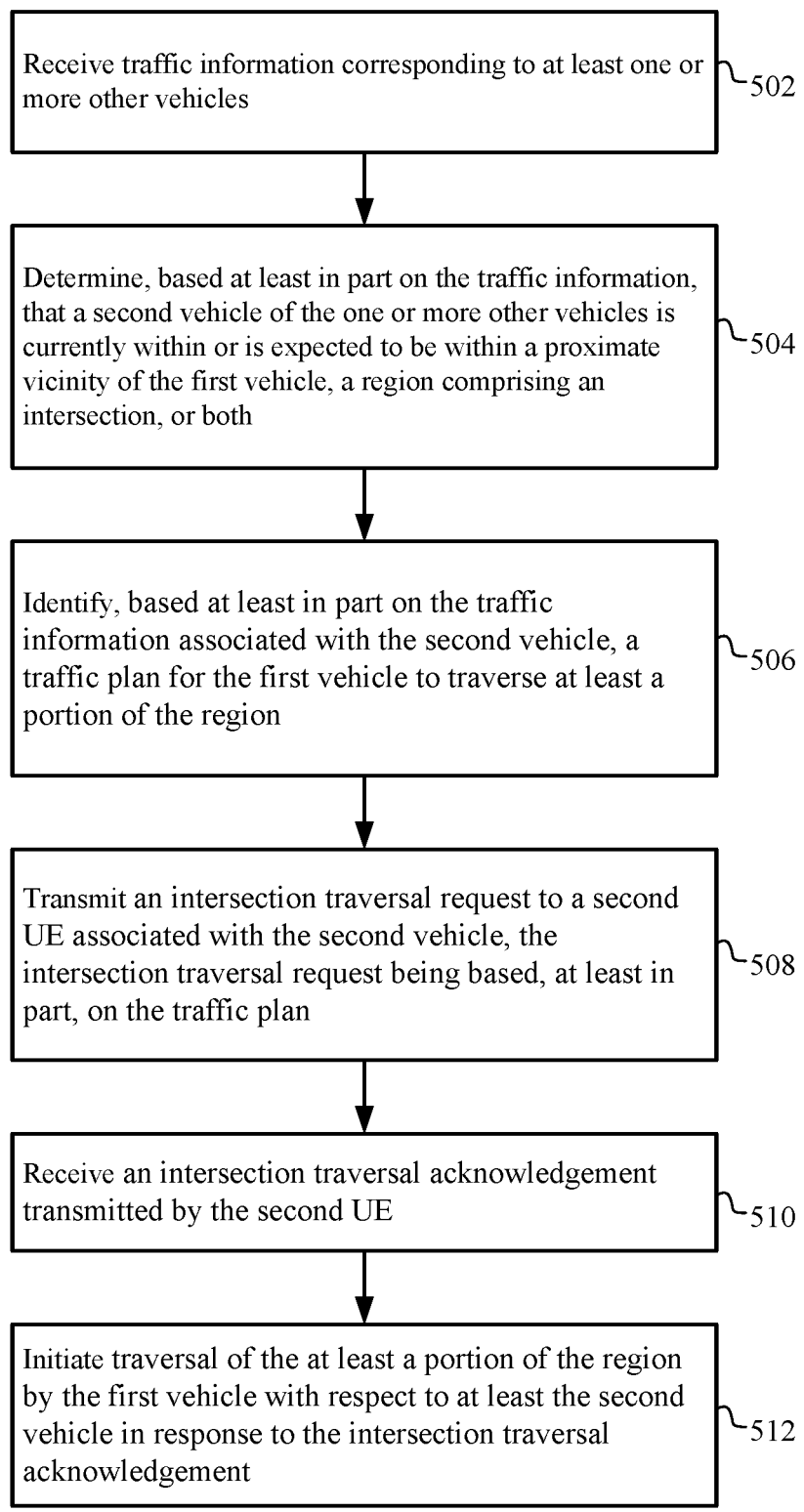
FIGS. 5A and 5B are related flow-diagrams illustrating some example methods for use by a first UE to support intersection travel coordination/negation with at least a second UE via transmission of an intersection traversal request, in accordance with certain aspects of the present disclosure.
Figure 6A:
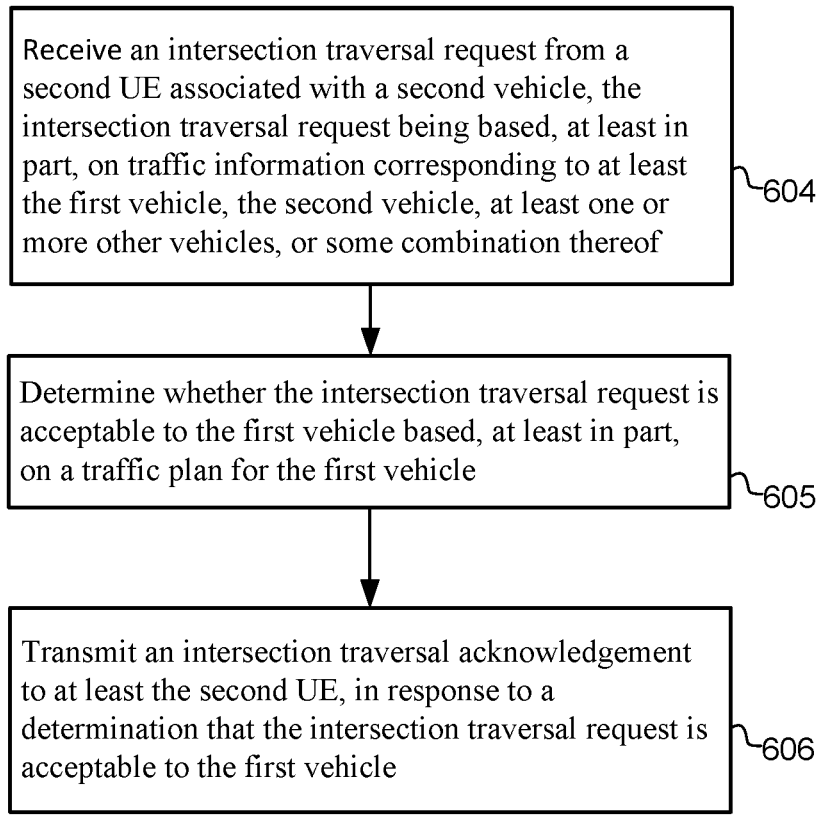
FIGS. 6A and 6B are related flow-diagrams illustrating some example methods for use by a UE to support intersection travel coordination/negotiation via transmission of an intersection traversal acknowledgement, in accordance with certain aspects of the present disclosure.

In certain implementations, negotiations between CV2X vehicles (UEs) may comprise all or part of processes 300, 400, 500/500' (FIGS. 5A/B below), and/or 600/600' (FIGS. 6A/B below). Shared (broadcast) traffic information may continually or otherwise inform the traffic planning process from time to time, and either through dedicated negotiation messaging, and/or travel plan based request and acknowledgement/non-acknowledgment messaging CV2X vehicles (UEs) may coordinate safe intersection traffic even in the presence of the non-CV2X vehicles.

Figure 5B:
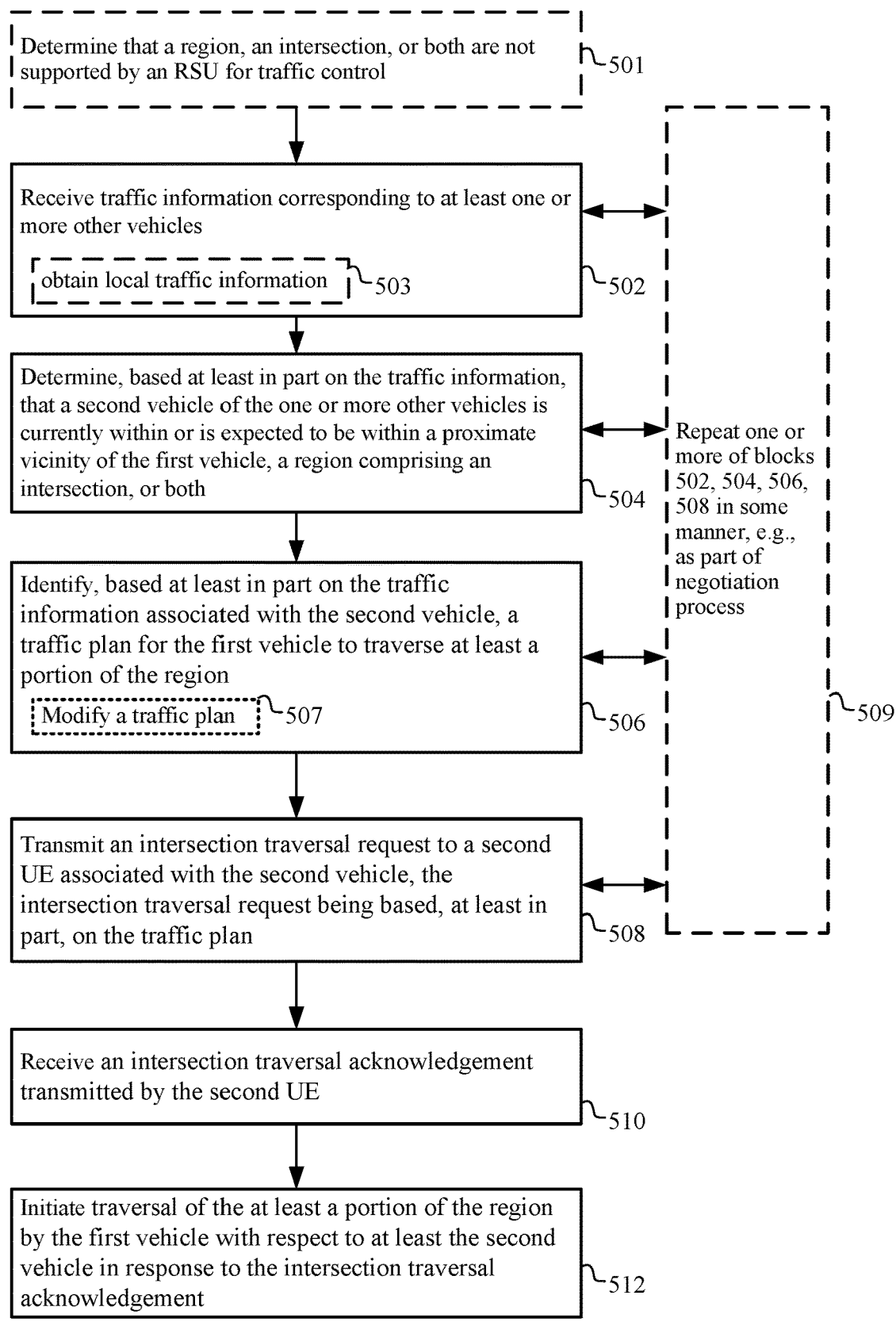

Attention is drawn next to FIGS. 5A and 5B, which are related flow-diagrams illustrating some example methods 500 and 500', respectively, for use by a first UE to support intersection travel coordination with at least a second UE via transmission of an intersection traversal request, in accordance with certain aspects of the present disclosure. Here, for example, both the first and second UEs comprise compatible communication capabilities.

With reference first to method 500 in FIG. 5A, at example block 502, a first UE associated with a first vehicle may receive traffic information corresponding to at least one or more other vehicles. In certain instances, traffic information may be received from one or more other UEs some or all of which may be associated with vehicles. In certain instances, traffic information may be received from one or more devices that may also be associated with the first vehicle. In certain instances, traffic information may be received from one or more wireless network devices, possibly from one or more servers or other devices connected to the wireless network.

At example block 504 the first UE may determine, based at least in part on the traffic information, that a second vehicle of the one or more other vehicles is currently within or is expected to be within a proximate vicinity of the first vehicle, a region comprising an intersection, or both. For example, traffic information may indicate that some vehicles may already be within, at or nearby the intersection, while other vehicles may be within the region have yet to reach the intersection or may have already traversed the intersection but are still with the region, while still other vehicles may have yet to reach the region or may have just left the region but may still be within some proximate vicinity that makes them of potential interest in routing and/or traffic planning. As previously described, one or more of the vehicles identified in the traffic information may not comprise a UE with a compatible or otherwise applicable communication capability (e.g., V2X, etc.) to support method 500 based traffic planning.

At example block 506, the first UE may identify, based at least in part on the traffic information associated with the second vehicle, a traffic plan for the first vehicle to traverse at least a portion of the region. The traffic information may comprise, for example, all or some of the traffic information per block 220 of FIG. 3 in certain implementations.

At example block 508, the first UE may transmit an intersection traversal request to a second UE associated with the second vehicle, the intersection traversal request being based, at least in part, on the traffic plan. For example, an intersection traversal request may comprise a ROW request with some or all of the information per block 314 of FIG. 3.

At example block 510, the first UE may receive an intersection traversal acknowledgement transmitted by at least the second UE. The intersection traversal acknowledgement may indicate that the second device approves of a traffic plan transmitted by the first UE, e.g., block 508.

At example block 512, the first UE (vehicle) may initiate traversal of the at least a portion of the region by the first vehicle with respect to at least the second vehicle in response to the intersection traversal acknowledgement. In certain example implementations, the first UE (vehicle) may be referred to as an Ego vehicle, e.g., as per FIG. 3 example.

Reference is made next to method 500' in FIG. 5B. Method 500' is similar to method 500 of FIG. 5A, but further includes some example optional blocks At (optional) block 501, the first UE may determine that a region and/or an intersection within the region may not be supported by a device, such as, e.g., an RSU, for traffic control. By way of an example, the first UE may consider information from one or more other devices which may be indicative of the presence or absence of an RSU or the like for a particular intersection or region. Thus, a network resource such as a base station, location or map service, etc., may provide such information in some implementations. In certain instances, such a decision at block 501 may be based, at least in part, on the absence of signaling from such an RSU or other like device as the first UE moves within some expect range of the region and/or intersection. In another example, a first UE may be informed as to the presence or absence of an RSU or the like by one or more other UEs. A decision at optional block 501 may indicate whether the first UE should attempt to coordinate intersection travel with one or more other compatible UEs per other aspects of method 500'.

At example block 502, the first UE associated with a first vehicle may receive traffic information corresponding to at least one or more other vehicles, wherein at least a portion of the traffic information is received from a second UE associated (e.g., being transported by a second vehicle) of the one or more other vehicles. At optional block 503, at least a portion of the traffic information may comprise locally obtained traffic information from the first vehicle (UE).

At example block 504 the first UE may determine, based at least in part on the traffic information, that at least one of the one or more other vehicles is currently within or is expected to be within: (1) a proximate vicinity of the vehicle, (2) a region comprising an intersection, or (3) both. For example, traffic information may indicate that some vehicles may already be within, at or nearby the intersection, while other vehicles may be within the region have yet to reach the intersection or may have already traversed the intersection but are still with the region, while still other vehicles may have yet to reach the region or may have just left the region but may still be within some proximate vicinity that makes them of potential interest in routing and/or traffic planning. As previously described, one or more of the vehicles identified in the traffic information may not comprise a UE with a compatible or otherwise applicable communication capability (e.g., V2X, etc.) to support method 500' based traffic planning.

At example block 506, the first UE may identify, based at least in part on the traffic information, a traffic plan for the first vehicle to safely traverse at least a portion of the region, the intersection, or both. The traffic information may comprise, for example, all or some of the traffic information per block 220 of FIG. 3 in certain implementations. At example block 508, the first UE may transmit an intersection traversal request to at least the second UE (which comprises a compatible or otherwise applicable communication capability. Here, for example, an intersection traversal request may be based, at least in part, on the traffic plan. For example, an intersection traversal request may comprise a ROW request with some or all of the information per block 314 of FIG. 3.

As illustrated by optional block 509, to support negotiation of one or more parameters or other aspects as part of method 500', all or part of one or more of blocks 502, 504, 506, and/or 508 may be repeated. For example, block 509 may occur if an intersection acknowledgement is not received in a timely manner per block 510. For example, block 509 may occur if a NACK is received in response to the request transmitted at block 508. At example block 507, which is optional, as part of block 506 all or part of a traffic plan may be modified as part of the negotiation process supported at block 509.

In certain example implementations, as part of a negotiation process with the second UE, per block 509, one or more of blocks 502, 504, 506, 508, or some combination may be repeated, e.g., thereof prior to block 510 wherein an indication that an agreement has been reached is received. Block 502 may further comprise receiving additional traffic information from the second UE in response to at least the intersection traversal request transmitted at block 508. Block 506/507 may further comprise modifying at least a portion of the traffic plan for the first vehicle based, at least in part on the additional traffic information. Block 508 may further comprise transmitting a second intersection traversal request to at least the second UE, the second intersection traversal request being based, at least in part, on the traffic plan as modified at block 506/507. At block 510, for example, the intersection traversal acknowledgement may be indicative of the second UE accepting the second intersection traversal request. Block 512 may further comprise initiating the traversal by the first vehicle based at least in part on the traffic plan, e.g., as modified at block 506/507.

At example block 510, the first UE may receive an intersection traversal acknowledgement transmitted by at least the second UE in response to the intersection traversal request. At example block 512, the first UE (vehicle) may initiate traversal of the at least a portion of the region, the intersection, or both by the vehicle based at least in part on the traffic plan. In certain example implementations, the first UE (vehicle) may be referred to as an Ego vehicle, e.g., as per FIG. 3 example.

With regard to FIGS. 3-5, blocks 302 and 501 may be similar, blocks 220, 402 and 502 may be similar, blocks 304, 306, 308, 310, 312, 404, 504, 506, and 509 may be similar, blocks 314, 406 and 508 may be similar, blocks 316, 408 and 510 may be similar, and blocks 318, 410 and 512 may be similar with regard to certain aspects of the traffic planning techniques presented herein by non-limiting examples.

Figure 6B:
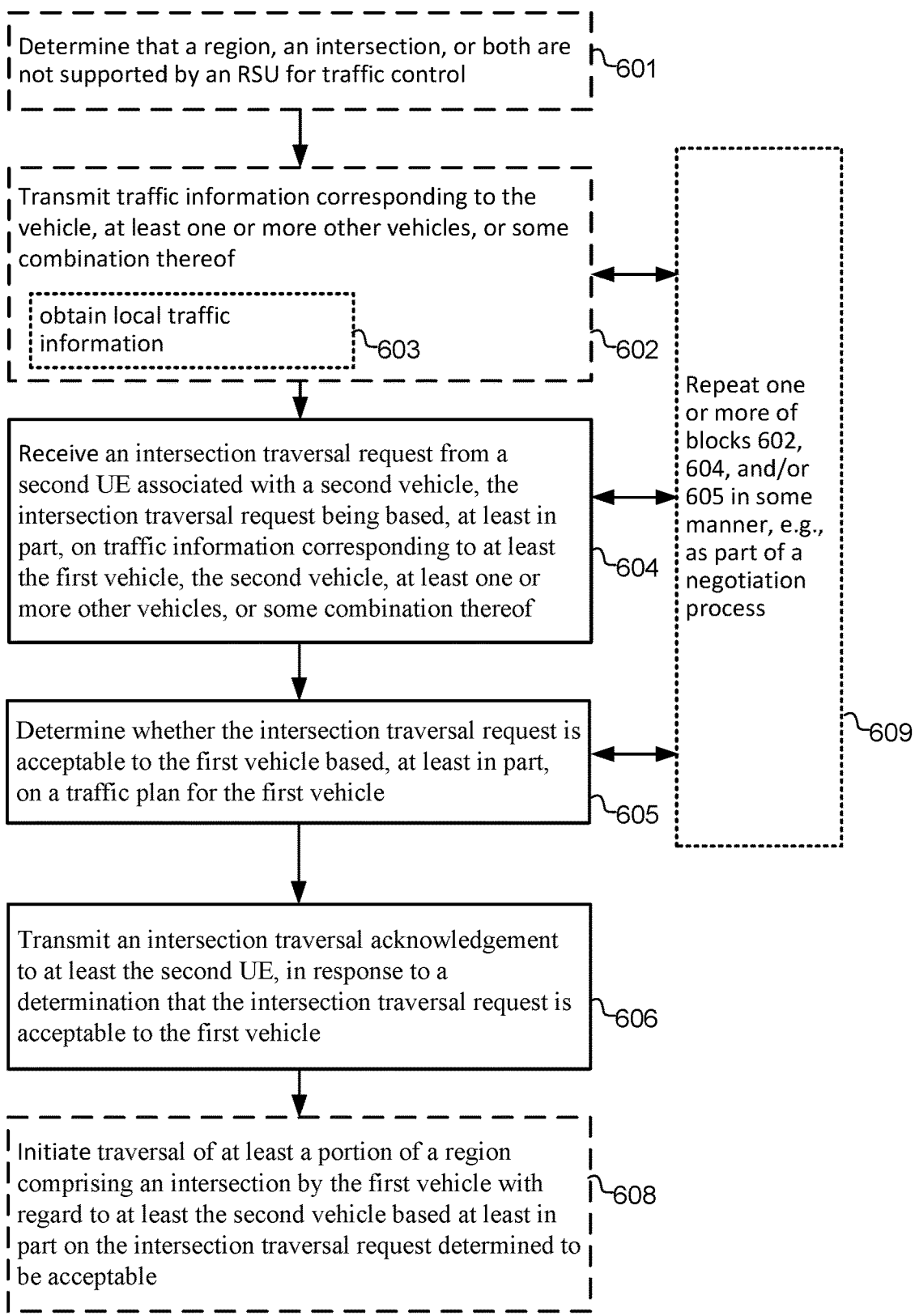

Attention is drawn next to FIGS. 6A and 6B, which may serve as a counter-part to FIGS. 5A/B, because they show flow-diagrams illustrating example methods 600 and 600' for use by a first UE to support intersection travel coordination via transmission of an intersection traversal acknowledgement, in accordance with certain aspects of the present disclosure. In certain example implementations, this first UE (vehicle) may be referred to as a non-Ego vehicle, e.g., as per FIG. 3 example.

At example block 604, the first UE may receive an intersection traversal request from a second UE associated with a second vehicle, the intersection traversal request being based, at least in part, on traffic information corresponding to at least the first vehicle, the second vehicle, at least one or more other vehicles, or some combination thereof.

At example block 605, the first UE may determine whether the intersection traversal request is acceptable to the first vehicle based, at least in part, on a traffic plan for the first vehicle. In certain example implementations, the first UE may determine, at least in part, whether an intersection traversal request is acceptable based on traffic information, or other information or capabilities per the processing unit(s) 212 of the FIG. 2 example.

At example block 606, in response to a determination that the intersection traversal request is acceptable to the first vehicle, the first UE may transmit an intersection traversal acknowledgement to at least the second UE. In certain example implementations, the first UE may determine, at least in part, whether an intersection traversal request is acceptable based on traffic information, or other information or capabilities per the processing unit(s) 212 of the FIG. 2 example.

Reference is made next to method 600' in FIG. 6B. Method 600' is similar to method 600 of FIG. 6A, but further includes some example optional blocks.

At example block 601, which may be optional, the UE may determine that a region and/or an intersection lack an RSU or other like device to support traffic planning/control. Block 601 may be similar to block 501.

At example block 602, the UE may transmit traffic information corresponding to the vehicle, at least one or more other vehicles, or some combination thereof. For example, block 602 may be similar to block 402 and may comprise all or part of the traffic information 220 of FIG. 3 or the like. Optional block 603 indicates that some of the traffic information by be obtained locally, e.g., by a sensor capability or the like. In certain example implementations, block 602 may be optional.

At example block 604, the UE may receive an intersection traversal request from a second UE (e.g., from an Ego vehicle per FIG. 3 example) associated with another vehicle of the one or more other vehicles. If applicable, the intersection traversal request may be based, at least in part, on the traffic information transmitted at (optional) block 602. For example, such a request may comprise one or more parameters per block 314, and/or the like. In certain implementations such a request may comprise a ROW request which may be accepted by way of an acknowledgment or rejected by a non-acknowledgement. In some implementations such a request may comprise a ROW demand that may require an acknowledgement. Here, for example, a ROW demand may be associated with a particular UE, vehicle, entity, etc., such as an emergency responder seeking priority traffic access.

At example block 605, the first UE may determine whether the intersection traversal request is acceptable to the first vehicle based, at least in part, on a traffic plan for the first vehicle. In certain example implementations, the first UE may determine, at least in part, whether an intersection traversal request is acceptable based on traffic information, or other information or capabilities per the processing unit(s) 212 of the FIG. 2 example.

At example block 606, in response to a determination that the intersection traversal request is acceptable to the vehicle (UE), the UE may transmit an intersection traversal acknowledgement to at least the second UE. At optional block 607, the UE may determine the intersection traversal request is acceptable, e.g., based on traffic information, or other information or capabilities per the processing unit(s) 212 of the FIG. 2 example.

At optional block 609, all or part of one or more of the aspects of example blocks 602, 604, and/or 606 may be repeated in some manner to support a negotiation between at least the UE and the second UE.

At example block 608, the UE may initiate traversal of the at least a portion of a region comprising an intersection by the vehicle based at least in part on the intersection traversal request determined to be acceptable. For example, in certain instances the UE may allow one or more of the other vehicles (with or without compatible communication capabilities) traverse the intersection before initiating traversal of the vehicle.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the UEs may have similar frame timing, and transmissions from different UEs may be approximately aligned in time. For asynchronous operation, the UEs may have different frame timing, and transmissions from different UEs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein, e.g., with regard to one or more processing units. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for use at a first user equipment (UE) associated with a first vehicle, the method comprising, at the first UE:
   (a) receiving traffic information corresponding to at least one or more other vehicles;
   (b) determining, based at least in part on the traffic information, that a second vehicle and a third vehicle of the one or more other vehicles is expected to be within a region comprising an intersection, the third vehicle traveling behind the second vehicle and in a same direction as the second vehicle;
   (c) identifying, based at least in part on the traffic information, a traffic plan for the first vehicle to traverse at least a portion of the region;
   (d) transmitting an intersection traversal request to a second UE associated with the second vehicle, the intersection traversal request being based, at least in part, on the traffic plan, the intersection traversal request indicating that the second UE is to cause a speed of the second vehicle to be modified to delay a time at which the third vehicle enters the intersection, the first UE and the second UE comprising a compatible wireless communication capability, and the third vehicle not comprising the compatible wireless communication capability;
   (e) receiving an intersection traversal acknowledgement transmitted by the second UE; and
   (f) initiating traversal of the at least a portion of the region by the first vehicle with respect to at least the second vehicle and the third vehicle based at least in part on the intersection traversal acknowledgement.

2. The method as recited in claim 1, wherein the traffic information further comprises traffic information locally-obtained by the first UE, traffic information received from the second UE, traffic information received from the one or more other vehicles, or some combination thereof.

3. The method as recited in claim 2, wherein the locally-obtained traffic information is associated with at least the third vehicle.

4. The method as recited in claim 1, wherein the traffic information is based, at least in part, on a sensor capability, a location capability, a routing capability, a vehicle characteristic, an environment characteristic, or some combination thereof, with regard to the first vehicle, the second vehicle, or at least one of the at least one or more other vehicles.

5. The method as recited in claim 1, wherein one or more of the traffic information, the traffic plan, the intersection traversal request, or the intersection traversal acknowledgement comprises information regarding: an open road space start location, an open road space stop location, an open road space distance measurement, a lane indication, an observation field of view or area, an unobserved area, a region identifier, an intersection identifier, a vehicle ingress point, a vehicle egress point, an estimated time of arrival (ETA), an estimated time to pass (ETP), a right-of-way (ROW) start time, a ROW end time, an intersection clearance indication, or some combination thereof corresponding, at least in part, to the region, the first vehicle, the second vehicle, at least one of the at least one or more vehicles, or some combination thereof.

6. The method as recited in claim 1, and further comprising negotiating with the second UE by repeating (a), (b), (c), (d), or some combination thereof prior to (e);
   wherein (a) further comprises receiving additional traffic information from the second UE in response to at least the intersection traversal request transmitted at (d);
   wherein (c) further comprises modifying at least a portion of the traffic plan for the first vehicle based, at least in part on the additional traffic information;
   wherein (d) further comprises transmitting a second intersection traversal request to at least the second UE, the second intersection traversal request being based, at least in part, on the traffic plan as modified at (c);
   wherein at (e) the intersection traversal acknowledgement is indicative of the second UE accepting the second intersection traversal request; and
   wherein (f) further comprises initiating the traversal by the first vehicle based at least in part on the traffic plan as modified at (c).

7. The method as recited in claim 1, wherein the intersection traversal acknowledgement received at (e) is indicative of the second UE accepting the intersection traversal request and wherein at (f) the traversal by the first vehicle is based at least in part on the traffic plan as identified at (c).

8. The method as recited in claim 1, wherein the intersection traversal request comprises a right-of-way (ROW) request.

9. The method as recited in claim 1, wherein the compatible wireless communication capability includes at least a vehicle-to-everything (V2X) capability.

10. The method as recited in claim 1, wherein the traffic information further corresponds to one or more non-vehicle objects of traffic interest within the region.

11. A method for use at a first user equipment (UE) associated with a first vehicle, the method comprising, at the first UE:
   (a) receiving an intersection traversal request from a second UE associated with a second vehicle, the intersection traversal request being based, at least in part, on traffic information corresponding to at least the first vehicle, the second vehicle, at least one or more other vehicles, or some combination thereof, a third vehicle, of the at least one or more other vehicles traveling behind the first vehicle and in a same direction as the first vehicle, the intersection traversal request indicating that the first UE is to cause a speed of the first vehicle to be modified to delay a time at which the third vehicle enters an intersection, the first UE and the second UE comprising a compatible wireless communication capability, and the third vehicle not comprising the compatible wireless communication capability;
(b) determining whether the intersection traversal request is acceptable to the first vehicle based, at least in part, on a traffic plan for the first vehicle; and
(c) transmitting an intersection traversal acknowledgement to at least the second UE, based at least in part on a determination that the intersection traversal request is acceptable to the first vehicle.

12. The method as recited in claim 11, and wherein (b) further comprises modifying the traffic plan based, at least in part, on the traffic information, the intersection traversal request, or both.

13. The method as recited in claim 11, and further comprising:
(d) causing the speed of the first vehicle to be modified to delay the time at which the third vehicle enters the intersection based at least in part on the intersection traversal request.

14. The method as recited in claim 11, wherein at least a portion of the traffic information has been obtained by the second UE from the first UE.

15. The method as recited in claim 14, wherein the portion of the traffic information obtained by the second UE from the first UE comprises locally-generated traffic information corresponding to the first vehicle, the first UE, or both.

16. The method as recited in claim 15, wherein the locally-generated traffic information corresponds to at least the third vehicle associated with a third UE.

17. The method as recited in claim 16, wherein compatible wireless communication capability includes a vehicle-to-everything (V2X) capability, and wherein the third UE does not comprise the V2X capability.

18. The method as recited in claim 11, wherein the intersection traversal request is determined to be acceptable and comprises routing information for the second vehicle corresponding to at least a portion of a region comprising the intersection.

19. The method as recited in claim 11, wherein one or more of the traffic information, the intersection traversal request, or the intersection traversal acknowledgement comprises information regarding: an open road space start location, an open road space stop location, an open road space distance measurement, a lane indication, an observation field of view or area, an unobserved area, a region identifier, an intersection identifier, a vehicle ingress point, a vehicle egress point, an estimated time of arrival (ETA), an estimated time to pass (ETP), a right-of-way (ROW) start time, a ROW end time, an intersection clearance indication, or some combination thereof corresponding, at least in part, to a region comprising the intersection, the first vehicle, the second vehicle, the third vehicle, or some combination thereof.

20. The method as recited in claim 11, wherein (a), (b), or both, occur a plurality of times before (c) occurs, as part of a UE-based distributed negotiation process.

21. The method as recited in claim 11, wherein (a), (b), or both make use of a direct communication channel between the first UE and the second UE.

22. The method as recited in claim 11, wherein the intersection traversal request comprises to a right-of-way (ROW) request.

23. A user equipment (UE) associated with a vehicle and comprising:
a transceiver;
memory; and
a processing unit coupled to the transceiver and the memory and wherein the processing unit is configured to:
(a) receive, via the transceiver, traffic information corresponding to at least one or more other vehicles, wherein at least a portion of the traffic information is received from a second UE associated with a second vehicle of the one or more other vehicles;
(b) determine, based at least in part on the traffic information, that the second vehicle and a third vehicle, of the one of the one or more other vehicles, are currently within a proximate vicinity of a region comprising an intersection, the third vehicle traveling behind the second vehicle and in a same direction as the second vehicle;
(c) identify, based at least in part on the traffic information, a traffic plan for the vehicle to traverse at least a portion of the intersection;
(d) initiate transmission of an intersection traversal request to at least the second UE via the transceiver, the intersection traversal request being based, at least in part, on the traffic plan, the intersection traversal request indicating that the second UE is to cause a speed of the second vehicle to be modified to delay a time at which the third vehicle enters the intersection, the UE and the second UE comprising a compatible wireless communication capability, and the third vehicle not comprising the compatible wireless communication capability;
(e) receive, via the transceiver, an intersection traversal acknowledgement transmitted by at least the second UE in response to the intersection traversal request; and
(f) initiate traversal of the at least a portion of the region by the vehicle based at least in part on the traffic plan and the intersection traversal acknowledgement.

24. The UE as recited in claim 23, wherein the traffic information further comprises traffic information locally-obtained by the vehicle, the UE, or both, and wherein the traffic information is based, at least in part, on a sensor capability, a location capability, a routing capability, a vehicle characteristic, an environment characteristic, or some combination thereof, with regard to at least one of the one or more other vehicles.

25. The UE as recited in claim 23, wherein the processing unit is further configured to perform (a), (b), (c), (d), or some combination thereof, one or more additional times before (e) occurs, as part of a UE-based distributed negotiation process.

26. The UE as recited in claim 23, wherein the intersection traversal request comprises a right-of-way (ROW) request.

27. A first user equipment (UE) associated with a first vehicle and comprising:
a transceiver;
memory; and
a processing unit coupled to the transceiver and the memory and wherein the processing unit is configured to:
(a) receive an intersection traversal request from a second UE associated with a second vehicle, the intersection traversal request being based, at least in part, on traffic information corresponding to at least the first vehicle, the second vehicle, at least one or more other vehicles, or some combination thereof, a third vehicle, of the at least one or more other vehicles traveling behind the first vehicle and in a same direction as the first vehicle, the intersection traversal request indicating that the first UE is to cause a speed of the first vehicle to be modified to delay a time at which the third vehicle enters an intersection, the first UE and the second UE comprising a compatible wireless communication capability, and the third vehicle not comprising the compatible wireless communication capability;

(b) determine whether the intersection traversal request is acceptable to the first vehicle based, at least in part, on a traffic plan for the first vehicle; and (c) transmit an intersection traversal acknowledgement to at least the second UE, based at least in part on a determination that the intersection traversal request is acceptable to the first vehicle.

28. The first UE as recited in claim 27, and wherein as part of (b), the processing unit is further configured to modify the traffic plan based, at least in part, on the traffic information, the intersection traversal request or both.

29. The first UE as recited in claim 27, and wherein the processing unit is further configured to perform (a), (b), or both a plurality of times before (c) occurs, as part of a UE-based distributed negotiation process.

30. The first UE as recited in claim 27, and wherein the processing unit is further configured to cause a speed of the first vehicle to be modified to delay the time at which the third vehicle enters the intersection based at least in part on the intersection traversal request being determined to be acceptable.

* * * * *